Patented May 9, 1933

1,908,512

UNITED STATES PATENT OFFICE

ARTHUR G. HEIDEMAN, OF YONKERS, NEW YORK

CHEESE-LIKE PRODUCT MADE FROM YEAST AND MILK-CONTAINING MATERIAL AND PROCESS OF PRODUCING THE SAME

No Drawing. Application filed July 13, 1931. Serial No. 550,624.

It is an object of the present invention to provide a cheese-like product which is produced from yeast and milk-containing material and which is edible and palatable.

It is another object of the invention to produce a cheese-like product from yeast and milk-containing material which possesses a cheese-like color and a pleasant taste, flavor and odor and which closely resembles ordinary cheese.

It is a further object of the invention to provide an edible cheese-like product which is packable and stable and which is capable of being handled in the ordinary channels of commerce as a satisfactory and merchantable product.

It is also within the purview of this invention to provide a cheese-like product which contains valuable substances occurring in the yeast and milk raw materials and which has a substantial dietetic and therapeutic value.

It is also within the contemplation of the invention to provide a cheese-like product which contains a substantial portion of the yeast from which it was made without having a yeast-like taste.

It is still a further object of the invention to provide a cheese-like product made from yeast and milk-containing substances which is almost sterile, substantially free from contaminations, substantially free from active bacteria and substantially free from proteolytic enzymes other than those occurring in yeast.

It is still another object of the invention to provide a cheese-like product which is nutritious and which can be used as a food.

Other objects and advantages of the present invention will become apparent from the following description.

Generally speaking, the novel cheese-like product is produced by effecting a reaction between autolyzed yeast and milk-containing material under controlled conditions which are adapted to effect the production of a satisfactory, edible and stable product. This procedure, broadly stated, involves causing the autolyzation of yeast in an appropriate manner as one skilled in the art will readily understand. The autolyzed yeast is then mixed with a raw milk-containing material. The acidity of the yeast-milk mixture is then adjusted to a range within which the yeast reacts with the milk material to give a cheese-like product. The yeast-milk mixture having an adjusted acidity is then subjected to curing under a controlled temperature which is within a range within which the yeast acts on the milk to form the novel cheese-like product. By adjusting the acidity and controlling the temperature in the foregoing manner, the production of the novel cheese-like product is favored while the growth of lactic acid bacteria, of yeast, and of foreign and undesirable bacteria and by products thereof is inhibited. By maintaining the yeast-milk mixture under the aforesaid conditions for a sufficient length of time, the novel cheese-like product is produced.

For carrying out the present invention in a practical manner, and for a better understanding of the invention by those skilled in the art, the following illustrative example is given. It is to be noted that the invention is not to be limited to the specific materials, conditions and the like which are specifically mentioned in this illustrative example that the scope of the invention is defined in the appended claims.

Edible yeast of the so-called bakers or brewers or by product alcohol type is autolyzed preferably by the addition of common salt. In practice, it is preferred to employ yeast containing approximately 70% to approximately 75% of moisture although a lower moisture content, say about 25%, may be used. The salt (sodium chloride) is preferably employed to the extent of approximately 3% to approximately 5% of the total weight of the finished product as computed on a wet basis. By proceeding in this manner, the yeast is not only autolyzed but the watery vehicle carrying the autolyzed yeast contains sufficient salt to assist in inhibiting the growth of putrefactive bacteria and to prevent putrefaction or spoilage of the finished product after incubation. In addition, the salt imparts a palatable taste to the finished product.

The salted autolyzed yeast is now thoroughly mixed and preferably homogenized with milk-containing material in the form of dried milk, preferably dried whole milk. The proportion of the autolyzed yeast to the dried whole milk is such that a paste is produced. In this paste, the acidity or pH value is adjusted so that the pH value is in a range from about 5 to about 7 and preferably about 6. The adjustment of the acidity is preferably effected by the addition of an edible organic acid to the mixture, preferably lactic acid or an acid having properties and characteristics similar thereto.

After a paste-like mixture of yeast and milk is prepared with an adjusted pH value, the mixture is incubated at a controlled temperature which is within a range from about 30° C. to about 50° C. and preferably within a range from about 35° C. to about 45° C. By incubating the yeast-milk mixture under the aforesaid condition of controlled acidity and controlled temperature for a sufficient period of time, the novel cheese-like product is produced. It is preferred to maintain the humidity more or less constant. In practice, it has been found that a period of time of about 7 days to about 14 days is sufficient to effect the production of the novel cheese-like product. During incubation it is desirable to thoroughly mix and stir the mixture so as to permit the liberation of gas formed in the process. In practice, a thorough mixing about once every three or four days has been found to be sufficient.

The product produced by the foregoing procedure has a brownish color, usually of light-brown character and resembles ordinary cheese. This is particularly true with respect to the taste, flavor, odor and general consistency and texture. It has been found that the novel cheese-like product is edible and palatable and is capable of being compressed, pasteurized and packed in a manner wholly satisfactory and similar to the customary practice in handling cheese. Tests showed that the product was substantially free from contaminations and active bacteria. In addition, the cheese-like product was stable and could be kept and stored at low temperatures just like ordinary cheese. Most of the valuable food-substances which were present in the autolyzed yeast and in the dry milk are available as nutritious substances.

A second illustrative example of carrying the invention into practice is as follows: About 90 parts of yeast having a moisture content of about 75 or 76% is autolyzed by the addition of sodium chloride. In carrying out the autolyzing of yeast about 10 parts of sodium chloride are used so that the finished cheese-like product contains about 5% of salt on a wet basis. This thus-autolyzed yeast is mixed with about 100 parts of dried whole milk to form a paste. The autolyzed yeast is mixed thoroughly with the dried milk and is preferably converted into a thoroughly homogenized mixture.

The yeast-milk mixture has its acidity adjusted by the addition of lactic acid thereto in such amount as to bring the pH value to about 6.0. With the present mixture about 0.01 part of lactic acid is sufficient. After adjusting the acidity, the yeast-milk mixture is incubated with a temperature of about 42° C. to 45° C. and preferably at about 43° C. By incubating the yeast-milk mixture under the aforesaid controlled conditions of temperature and acidity for a sufficient period of time, say preferably about 10 days, the novel cheese-like product is obtained.

A third illustrative example of carrying the present invention into practice is as follows. Yeast is autolyzed with salt and is then mixed with dry whole milk as set forth hereinabove. In this instance, it is preferred to add sweet butter to the yeast-milk mixture so as to improve the consistency and taste of the cheese as well as to increase the buter fat content of the resultant product. The initial mixture before incubation had the following composition:

| | Per cent |
|---|---|
| Autolyzed yeast | about 37.5 |
| Sodium chloride | about 5.0 |
| Dried whole milk | about 37.5 |
| Sweet butter or butter-like material | about 20.0 |
| pH | 5.977 |

The foregoing mixture was treated in the same manner as the yeast-milk mixture in the first and second examples given hereinabove. The product was the same cheese-like product which has been described herebefore.

In connection with the pH values it should be noted that if the pH value is too low, the product tends to have an "off" odor and tends to be quite sour. On the other hand, if the pH value is too high the product tends to darken and tends to have a strong odor. When a pH value above 7.0 is used ammonia tends to be and is produced.

With respect to the thermal conditions under which the process is carried out, it should be noted that if a temperature, such as ordinary room temperature or ice box temperature, is utilized for the incubation, the growth of yeast and of other contaminating bacteria including lactic acid bacteria is promoted to a detrimental extent. Care, therefore, should be exercised with respect to the control of the temperature so that the detrimental reactions are avoided and the desired reaction is favored. As pointed out hereinbefore, the use of salt to the extent of say about 3 to 5% and the incubation at higher temperatures aids in effecting the desired reactions and the production of the desired cheese-like product while at the same time inhibiting the growth of yeast, lactic acid bacteria and other mesophillic organisms.

In producing the present novel cheese-like product with the process described hereinabove, it is desired to use glass or glass lined vessels, containers, utensils and the like in order to prevent any metallic contamination. In practice, glass containers or glass-lined pans may be used satisfactorily for holding the yeast-milk mixture during the incubation period although other containers which do not react or affect the mixture may be used.

The cheese-like product is made in such a manner that the vitamins contained in the raw materials are not destroyed to any substantial extent and are retained in the finished product. In addition, the yeast is likewise contained in the finished product. In this connection, bacteriological tests showed that the yeast is killed and that the product is almost sterile. The food value and digestibility of the present cheese-like product is at least equal to or better than the ordinary cheese usually found on the market.

I claim:—

1. The process of producing a cheese-like product which comprises mixing autolyzed yeast and milk-containing material together to form a paste, adjusting the acidity of said paste so that the pH value is within a range extending from about 5 to about 7, and incubating said yeast-milk paste at a temperature within a range extending from about 30° to about 50° C.

2. The process of producing a cheese-like product which comprises autolyzing yeast with salt, mixing the autolyzed yeast with dried milk to form a paste, adjusting the acidity of said yeast-milk paste so that the pH value is within a range extending from about 5 to about 7, and incubating said yeast-milk paste at a temperature within a range extending from about 35° C. to about 45° C.

3. The process of producing a cheese-like product which comprises autolyzing yeast with salt in such amount that the salt is present in the finished product to an extent of approximately 3% to approximately 5%, mixing said autolyzed yeast with dried whole milk to form a paste, adjusting the acidity of said yeast-milk paste with lactic acid so that the pH value is within a range extending from about 5 to about 7, and incubating said yeast-milk paste at a temperature within a range from about 35° C to about 45° C for a period of time up to about 7 days to about 14 days.

4. A cheese-like product consisting of the reaction product of autolyzed yeast and milk-containing material and having the property of resembling ordinary cheese with respect to taste, flavor and odor.

5. A cheese-like product consisting of the reaction product of autolyzed yeast and milk-containing material and having the property of resembling ordinary cheese with respect to taste, flavor and odor, said product containing sodium chloride.

6. A cheese-like product consisting of the reaction product of autolyzed yeast and milk-containing material and having the following characteristics: 1, resembling the taste, flavor and odor of ordinary cheese. 2, possessing a gray brownish color. 3, containing sodium chloride. 4, having a pH value of about 5 to about 7.

7. A cheese-like product consisting of the reaction product of autolyzed yeast and dried whole milk and having the following characteristics: 1, resembling the taste, flavor and odor of ordinary cheese. 2, possessing a gray brownish color. 3, containing about 3 to about 5% sodium chloride. 4, having a pH value of about 5 to about 7. 5, containing fat.

In witness whereof, I have hereunto placed my hand.

ARTHUR G. HEIDEMAN.